(12) United States Patent
Brown et al.

(10) Patent No.: US 11,264,614 B2
(45) Date of Patent: Mar. 1, 2022

(54) ENERGY STORAGE DEVICE AND IONIC CONDUCTING COMPOSITION FOR USE THEREIN

(71) Applicant: Thermal Ceramics UK Limited, Merseyside (GB)

(72) Inventors: Martyn Brown, Merseyside (GB); Richard Clark, Hayward, CA (US); Jason Peter Street, Augusta, GA (US)

(73) Assignee: Thermal Ceramics UK Limited, Merseyside (GB)

(*) Notice: Subject to any disclaimer, the term of this patent is extended or adjusted under 35 U.S.C. 154(b) by 19 days.

(21) Appl. No.: 16/263,258

(22) Filed: Jan. 31, 2019

(65) Prior Publication Data

US 2019/0237765 A1    Aug. 1, 2019

Related U.S. Application Data

(63) Continuation-in-part of application No. PCT/GB2019/050222, filed on Jan. 25, 2019.

(30) Foreign Application Priority Data

Feb. 1, 2018 (GB) .................................... 1801684
Aug. 7, 2018 (GB) .................................... 1812792
Aug. 7, 2018 (GB) .................................... 1812793

(51) Int. Cl.
*H01M 4/58* (2010.01)
*C01B 33/26* (2006.01)
(Continued)

(52) U.S. Cl.
CPC .......... *H01M 4/5825* (2013.01); *C01B 33/20* (2013.01); *C01B 33/24* (2013.01); *C01B 33/26* (2013.01);
(Continued)

(58) Field of Classification Search
None
See application file for complete search history.

(56) References Cited

U.S. PATENT DOCUMENTS 4,544,614 A  10/1985  Kucera et al.
7,947,397 B1* 5/2011  Delnick ................. H01G 11/38
                                                429/232

(Continued)

FOREIGN PATENT DOCUMENTS

CN    106684292 A    5/2017
CN    106711380 A    5/2017
(Continued)

OTHER PUBLICATIONS

Derwent Abstract for Ishihara et al. (JP 2013-144636 A), Derwent Acc-No. 2013-L96030, copy attached as PDF. (Year: 2013).*
(Continued)

*Primary Examiner* — Katie L. Hammer
(74) *Attorney, Agent, or Firm* — Servilla Whitney LLC

(57) ABSTRACT

The present invention relates to an energy storage device comprising a silicate comprises a formula:

$$M_v M1_w M2_x Si_y O_z$$

where
M is selected from the group consisting of Li, Na, K, Al, and Mg
M1 is selected from the group consisting of alkaline metals, alkaline earth metals, Ti, Mn, Fe, La, Zr, Ce, Ta, Nb, V and combinations thereof;
M2 is selected from the group consisting of B, Al, Ga, Ge or combinations thereof;
v, y and z are greater than 0;
w and/or x is greater than 0;
y≥x; and (Continued)

wherein $M_vM1_wM2_xSi_yO_z$ accounts for at least 90 wt % of the composition.

14 Claims, 4 Drawing Sheets

(51) Int. Cl.

| | |
|---|---|
| C01B 33/32 | (2006.01) |
| H01M 4/485 | (2010.01) |
| H01M 10/056 | (2010.01) |
| C01B 33/20 | (2006.01) |
| C01B 33/24 | (2006.01) |
| C03C 3/04 | (2006.01) |
| C03C 3/076 | (2006.01) |
| H01M 10/0562 | (2010.01) |
| H01M 50/434 | (2021.01) |
| H01M 50/437 | (2021.01) |
| H01M 50/431 | (2021.01) |
| H01M 10/0525 | (2010.01) |

(52) U.S. Cl.
CPC ............... *C01B 33/32* (2013.01); *C03C 3/04* (2013.01); *C03C 3/076* (2013.01); *H01M 4/485* (2013.01); *H01M 10/056* (2013.01); *H01M 10/0562* (2013.01); *H01M 50/431* (2021.01); *H01M 50/434* (2021.01); *H01M 50/437* (2021.01); *H01M 10/0525* (2013.01); *H01M 2300/002* (2013.01); *H01M 2300/0085* (2013.01); *Y02E 60/10* (2013.01)

(56) References Cited

U.S. PATENT DOCUMENTS

| | | | | |
|---|---|---|---|---|
| 8,182,943 B2* | 5/2012 | Visco | ................... | H01M 4/133 429/231.95 |
| 2005/0069779 A1 | 3/2005 | Yoshimura et al. | | |
| 2013/0115514 A1 | 5/2013 | Nishijima et al. | | |
| 2013/0136981 A1* | 5/2013 | Peuchert | ........... | H01M 10/0525 429/188 |
| 2014/0197351 A1 | 7/2014 | Balagopal et al. | | |
| 2015/0162642 A1* | 6/2015 | Tsujimura | ............... | C03C 3/062 65/17.2 |
| 2015/0266769 A1* | 9/2015 | Nishida | ................... | C03B 37/02 501/38 |

FOREIGN PATENT DOCUMENTS

| | | |
|---|---|---|
| CN | 107316965 A | 11/2017 |
| EP | 2891638 A1 | 7/2015 |
| JP | S63266762 A | 11/1988 |
| JP | 3637690 B2 | 4/2005 |
| JP | 2013144636 A * | 7/2013 |
| WO | 2011162348 A1 | 12/2011 |
| WO | 2012067249 A1 | 5/2012 |
| WO | 2013/130723 A1 | 9/2013 |
| WO | 2014136650 A1 | 9/2014 |

OTHER PUBLICATIONS

English text machine translation of Ishihara et al. (JP 2013-144636 A), accessed from the Espacenet website, PDF copy attached to the case file as a PDF. (Year: 2013).*

Deubener, J., et al., "Updated definition of glass-ceramics", Journal of Non-Crystalline Solids 501 (2018), pp. 3-10.

Miyauchi, Katsuki, et al., "New Amorphous Thin Films of Lithium Ion Conductive Solid Electrolyte", Solid State Ionics 9 & 10 (1983), pp. 1469-1472.

Tsujimura, Tomoyuki, "Li-ion conductive phosphosilicate glass ceramics synthesized by ion exchange", Solid State Ionics 262 (2014), pp. 829-832.

Zhao, Xinxin, et al., "Inorganic ceramic fiber separator for electrochemical and safety performance improvement of lithium-ion batteries", Ceramics International 43 (2017), pp. 14775-14783.

* cited by examiner

ENERGY STORAGE DEVICE AND IONIC CONDUCTING COMPOSITION FOR USE THEREIN

FIELD OF THE INVENTION

The present invention relates to energy storage devices and components thereof which comprise silicate compositions, particularly melt formable and melt formed. The silicate compositions in the form of fibres, particles, film and membrane and matrixes comprising said compositions.

BACKGROUND TO THE INVENTION

During charging of a conventional lithium-ion energy storage cell, electrons flow from an external voltage source and lithium cations flow through the liquid electrolyte toward the anode. When the cell is discharged, the lithium cations flow through the electrolyte and the electrons flow from the anode to the cathode through a load.

In order to avoid a short circuit within the energy storage cell, a layer which is electrically insulating but permeable to lithium cations is located between the two electrodes. This is known as a separator, which typically is of a conventional form such as a thin polymeric material, a ceramic-coated polymeric material, a ceramic-polymer composite, or a non-woven fabric. In a conventional lithium ion cell, the separator is typically immersed in a liquid electrolyte which fills the space between anode and cathode in entirety.

Separators must resist mechanical stresses and this limits the working thickness for conventional separator films based, for example, on polyolefins. Current separator thickness is determined as that which is sufficient to prevent short circuits caused by dendritic growth of lithium metal, but still be permeable to Li-ion transport.

A demand for high power densities has placed increasing demands upon the performance of separators. Polyolefin separators have current shutdown characteristics within a temperature range of typically from 130 to 170° C. as micropores in the separator close in this temperature range, and this is intended to prevent further flow of lithium cations across the separator. However, in batteries which have larger surfaces, for example large format batteries, the chance for short circuit increases, since the melting of the polyolefin is not uniform across its full area at an elevated temperature and when one area melts it actually increases the likelihood of failure in an adjacent area because of the consequent increase in current density.

While some ceramic materials possess good lithium ion conductivity, either alone or in specific battery systems, this is but one of a list of requirements (e.g. electrochemical stability, mechanical properties) demanded of ceramic materials to be integrated into a variety of energy storage devices. As such, there is still a need for an increased variety of lithium ion conductive ceramic materials for use in the variety of lithium battery systems, particularly material which can be manufactured on a large scale and that preferably can be used in a variety of locations within the batteries.

SUMMARY OF THE INVENTION

In a first aspect of the present invention, there is provided an energy storage device comprising a silicate composition comprising a formula:

$$M_v M1_w M2_x Si_y O_z \quad [1]$$

where
M is selected from the group consisting of Li, Na, K, Al, and Mg
M1 is selected from the group consisting of alkaline metals, alkaline earth metals, Ti, Mn, Fe, Zr, La, Ce, Ta, Nb, V and combinations thereof;
M2 is selected from the group consisting of B, Al, Ga, Ge or combinations thereof;
v, y and z are greater than 0;
w and/or x is greater than 0;
y≥x; and
wherein $M_v M1_w M2_x Si_y O_z$ accounts for at least 50 wt % of the composition.

The energy storage device is preferably a lithium, magnesium, aluminium, potassium, sodium storage device. More preferably the energy storage device is a lithium or sodium energy storage device and even more preferably the energy storage device is a lithium storage device.

It will be understood that reference to lithium in the specification in the context of lithium energy storage devices (e.g. lithium ion or lithium metal anode) may be substituted for sodium, potassium, magnesium or aluminium in the context of sodium, potassium, magnesium or aluminium energy storage devices.

Where Li, Al, Mg, K and Na falls under two groups from M, M1 and M2, the component will be assigned to group M, if that component is the basis of the metal of the energy storage device (e.g. Na for a Na energy storage device), otherwise it will be assigned to M1 or M2.

Preferably M1 is selected from the group consisting of alkaline earth metals, Ti, Mn, Fe, Zr, Ce and combination thereof. More preferably M1 is selected from Ti and Zr and combinations thereof. Preferably, M2 is selected from B, Al, Ga or combinations thereof. The silicate composition is preferably melt formable (i.e. able to be manufactured using a melt technique) and more preferably melt formed (i.e. made by a melt technique). Melt formable is taken to mean that the composition (e.g. silicate composition fibre) is formable from a molten mass using conventional melt techniques. Melt techniques include, but are not limited to, techniques which can form fibres (i.e. fiberisation) from the melt (molten mass) using: centrifugal formation of fibres; drawing; air jet attenuation or otherwise bushing, blasting, blowing and spinning forming techniques to form the molten mass into fibres. Melt techniques are more readily scalable to produce large quantities (e.g. between 10 and 900 tonnes per day or more) which is significantly greater than alternative techniques, such as electrospinning (sol-gel) techniques. Fibres made using the melt techniques may be converted to particles using known milling techniques. Preferably, particles are formed from melt formed fibres or from a melt formed mass.

In some embodiments, "melt formed" refers to a composition that has been obtained from a molten mass of glass that forms a glass or glass ceramic composition obtained from the molten mass of glass. Molten may refer to the mass of glass being raised sufficiently above the softening point of the glass to enable the formation of a glassy film (e.g. by rolling or pressing techniques). In another embodiment, molten may refer to the mass of glass being raised sufficiently above the softening point of the glass to lower the viscosity of the glass sufficiently to enable fibres or nanowires to be formed. It will be understood that a melt formed silicate composition is a silicate composition directly derived from a molten mass (i.e. not via a precursor glass material which is further processed (e.g. ion exchange) to obtain the silicate composition.)

In some embodiments, the silicate composition is a glass composition.

In other embodiments, the silicate compositions are a glass-ceramic composition. The glass-ceramic composition preferably comprises a glass phase and a crystalline phase preferably ranging from 0.1 wt % to 95 wt %.

The molar proportion of network formers to network modifiers in the silicate composition is preferably greater than 1.0, more preferably greater than 1.2 and even more preferably greater than 1.3 and yet even more preferably greater than 1.4. The higher the ratio of network formers to network modifiers the more melt formable the composition is likely to be.

For the purposes of the present invention M1 are considered network modifiers and M2 are considered to be network formers. Unless otherwise indicated intermediates (i.e. components which can act as network formers or modifiers) will be taken to be network modifiers.

Having sufficient network formers assists in the formation of fibres from a melt and enables finer fibre diameters to be more readily produced. Furthermore, by limiting the amount of $Li_2O$, unfavourable reactions with moisture forming LiOH may be avoided. A good balance of properties (ionic conductivity, chemical resistance, ease of fiberisation) has been obtained when the ratio of network formers to network modifiers is preferably no more than 5.0, more preferably no more than 4.0 and even more preferably no more than 3.0.

In one embodiment, $(x+y)>1.0\times(v+w)$ or $(x+y)>1.2\times(v+w)$ or $(x+y)>1.3\times(v+w)$ or $(x+y)>1.4\times(v+w)$. In another embodiment $(x+y)<5.0\times(v+w)$, more preferably $(x+y)<4.0\times(v+w)$; and more preferably $(x+y)<3.0\times(v+w)$.

Preferably, $v/(v+w+x+y)<0.5$, more preferably $<0.45$ and even more preferably less than 0.35. A lower proportion of lithium reduces the propensity of unfavourable reactions as previously stated. $v/(v+w+x+y)$ is preferably at least 0.1.

M1 preferably comprises or consists of Zr. In embodiments comprising Zr:Li/(Li+Zr+Si) is preferably $<0.5$, more preferably less than 0.45 and more preferably $<0.35$. Li/(Li+Zr+Si) is preferably at least 0.1.

In a preferred embodiment, the silicate composition comprises:
  1 to 30 wt % (and preferably 3 to 15 wt %) of the oxide form of M;
  10 to 60 wt % (and preferably 20 to 50 wt %) of the oxide form of M1;
  0 to 50 wt % (and preferably 0.5 to 20 wt %) of the oxide form of M2;
  20 to 80 wt % (and preferably 30 to 75 wt %) $SiO_2$; and
  0 to 30 wt % other components (not already listed in Formula 1).

Preferably at least 70 wt %, more preferably at last 80 wt %, even more preferably at least 90 wt % and yet even more preferably at least 95 wt % or 98 wt % or 99 wt % or 99.5 wt % of the composition comprises $M_vM1_wM2_xSi_yO_z$. Other materials in the composition, not forming part of the Formula 1, may relate to additives (preferably oxides), including components which have been substituted for M1 and/or M2, as would be appreciated by those skilled in the art. In a preferred embodiment, the composition consists of Formula [1] and impurities.

In a preferred embodiment the silicate composition comprises a formula:

$$Li_vM1_wAl_xSi_yO_z \qquad [2]$$

where
  M1 is selected from the group consisting of Ti, Zr and combinations thereof;

v, y and z are greater than 0;
w and/or x is greater than 0;
y≥x; and
wherein $Li_vM1_wAl_xSi_yO_z$ accounts for at least 80 wt % of the composition.

Preferably at least 90 wt %, more preferably at last 95 wt %, even more preferably at least 99 wt % and yet even more preferably at least 99.5 wt % of the composition comprises $Li_vM1_wAl_xSi_yO_z$.

In another preferred embodiment, M1 comprises or consists of $ZrO_2$ and/or $TiO_2$ and M2 optionally comprises $Al_2O_3$.

The silicate composition may comprises between 0 and 40 wt % (or between 0.5 wt % and 20 wt %) of $TiO_2$ and $Al_2O_3$ (combined) and preferably comprises between 0.5 and 12 wt % of $TiO_2$ and $Al_2O_3$ (combined).

In another preferred embodiment, the silicate composition comprises the molar formula;

$$Li_{2\,to\,4}Zr_{0\,to\,1}Ti_{0\,to\,1}Al_{0\,to\,2}Si_{4\,to\,6}O_z \text{ where } z>0.$$

(i.e. v in the range 2 to 4; w in the range 0 to 1; x in in the range 0 to 1; and y in the range 4 to 6)

The melt formable silicate composition of the present invention provides an excellent blend of properties such as high temperature mechanical performance and low shrinkage at elevated temperatures as well as having lithium ion conductive properties.

The fibres may be advantageously produced using melt spun techniques to produce fibres with an arithmetic diameter of less than 3.0 µm, preferably less than 2.0 µm and even more preferably less than 1.1 µm. Extra fine fibre diameters can be achieved using high speed spinning techniques as disclosed by the applicant in WO2017121770. Air classification techniques, or the like, may be adopted to selectively harvest the finer fibre diameters from a broader fibre population, thereby enabling fibres to be obtained within the nanowire diameter region (i.e. less than 1000 nm). Fibre diameters are typically at least 400 nm or at least 600 nm using these techniques. Despite the additional separation step, fibres produced via a melt formed technique are inherently more scalable in production than those produced by electrospinning techniques or the like.

In one embodiment, the fibres are self-supporting and suitable for use in a separator; a composite electrolyte (electrolyte matrix) or a solid state electrolytic material.

The melt formable silicate composition (e.g. fibre) may comprise lithium zirconium silicate, or lithium calcium silicate. Preferably, the silicate fibre comprises lithium zirconium silicate. Lithium zirconium silicate compositions have been found to have particularly good lithium ion conductivity.

The applicant considers that lithium zirconium silicate compositions as claimed have not previously been used in energy storage devices in any form, including a particle, a film, a nanowire or a fibre. Thus, in a special aspect of the present invention there is provided an energy storage device comprising lithium zirconium silicate. The lithium zirconium silicate may be in any suitable form including particles, nanowires, fibres or as a film. In one embodiment, the lithium zirconium silicate is in the form of nanowires or fibres. In another embodiment, the lithium zirconium silicate is in the form of particles. In another embodiment, the lithium zirconium silicate is in the form of a glass film.

The silicate composition preferably forms part of an electrolyte, a separator and/or an electrode.

In some embodiments, the silicate composition may be at least partially amorphous (e.g. a glass ceramic). In other embodiments, the silicate composition is at least partially crystalline. In other embodiments, the silicate compositions are substantially crystalline or substantially (e.g. greater than 50 wt %, preferably greater than 75 wt % and more preferably greater than 95 wt %) amorphous.

The energy storage device is preferably a lithium ion battery, although in some embodiments the energy storage device may comprise a capacitor, including a super capacitor. For the purposes of the present invention, an energy storage device also encompasses a fuel cell.

It will be appreciated that the inventive concept may be applied to other metal ion battery chemistries. As such, the inventive concept extends to all metal ion electrochemical devices comprising the associated metal ion conducting inorganic fibres. Many of the inorganic fibres compositions can be readily converted to the corresponding metal ion composition through the stoichiometric replacement of lithium ions with alternative metal cations.

The incorporation of silicate compositions within energy storage devices enable or enhance lithium ion mobility through the inorganic lattice, either within a separator and/or within the electrolyte itself.

The incorporation of lithium ion conducting inorganic fibres or particles enables lithium ion energy storage devices to have increased design freedom. When incorporated into separators and/or electrolytes, the fibres are able to enhance mechanical and high temperature robustness of the devices, with the use of inorganic fibres or particles as an electrolyte also having the potential to avoid or lessen lithium dendrite formation.

In a second aspect of the present invention, there is provided a process to produce the silicate composition of the first aspect of the present invention using a melt formed process, such as melt spun or melt blown techniques.

In a third aspect of the present invention there is provided silicate compositions as defined in the first aspect of the present invention. The silicate compositions are preferably for use in a separator; a solid electrolyte or a silicate composition/organic electrolyte matrix.

In a fourth aspect of the present invention, there is provided a separator comprising the silicate compositions as defined in the first aspect of the present invention.

In a fifth aspect of the present invention, there is provided a solid electrolyte comprising the silicate compositions as defined in the first aspect of the present invention.

In one embodiment, the solid electrolyte is in the form of an amorphous film.

In a sixth aspect of the present invention, there is provided a silicate composition/organic electrolyte matrix. The formation of a matrix comprising the silicate composition/ lithium ion conducting electrolyte (solid or liquid) may result in energy storage devices which comprise lithium ion conducting pathways between electrodes which may be partially through organic electrolytes (solid and/or liquid) and partially through inorganic electrolytes (including silicate compositions) and partially through the interfaces between the organic and inorganic electrolytes.

In some embodiments, the lithium ion conducting pathways between the electrodes may be continuously through inorganic electrolytes. Inorganic particles may be added to the matrix to increase the number of lithium ion pathways through the inorganic component of the matrix. The addition of inorganic particles may also enable the proportion of the inorganic component in the matrix to increase.

In one embodiment, the electrolyte matrix comprises:
0 to 80 wt % (or 2 to 80 wt %) and preferably 10 to 40 wt % silicate composition fibres;
0 to 80 wt % (or 3 to 40 wt %) and preferably 5 to 20 wt % silicate composition particles;
20 to 98 wt %, preferably 30 to 95 wt % and more preferably 40 to 80 wt % lithium ion conducting organic electrolyte (e.g. PAN or PEO combined with $LiClO_4$)

The lithium ion conducting organic electrolyte may include an electrolytic salt (e.g. lithium salt) dissolved or dispersed in an electrolytic medium.

In another embodiment, the electrolyte matrix comprising:
0.5 wt % to 40 wt % (preferably 1.0 wt % to 20 wt %) of the silicate composition;
a electrolytic salt (e.g. lithium salt); and
an electrolytic medium.

The electrolytic medium may be a polymer, a liquid (i.e. solvent) or a gel.

In one embodiment, the electrolytic medium is a polymer and said matrix is a membrane of between 10 μm and 100 μm thick and wherein the silicate composition increases the tensile strength of the membrane by at least 50% relative to a membrane comprising the same electrolytic medium without the silicate composition. The silicate composition is preferably in the form of fibres or nanowires. The addition of the silicate composition to the polymer electrolyte has the advantages of:
a) increasing conductivity;
b) increasing thermal stability;
c) increasing electrochemical stability window;
d) improving mechanical strength The proportion of the silicate composition within the electrolyte matrix may depend on the mix of functionality required. For example, in some embodiments, the proportion of the silicate composition may be determined from a required balance of ionic conductivity and mechanical properties.

For solvents, the amount of lithium salt is typically chosen such that the lithium salt is completely soluble in the solvent at the operating temperature of the energy storage device. As such, the relative amounts of these components will vary depending upon the specific lithium salts and solvent used. However, the electrolyte matrix may typically comprise, in addition to the silicate composition:
1 wt % to 50 wt % lithium salt (or other M ion salt); and
30 wt % to 98.5 wt % electrolytic medium.

The amount of the silicate composition is chosen to enhance the combination of mechanical and conductive properties of the electrolyte. The silicate composition is preferably between 1 wt % and 15 wt % and more preferably between 3 wt % and 12 wt % and even more preferably between 4 wt % and 10 wt %.

Preferably, the electrolyte matrix has a total conductivity at room temperature of greater than $1 \times 10^{-4}$ S $cm^{-1}$.

In embodiments where the electrolytic medium is a polymer, the polymer may be selected for its lithium ion conductivity and/or its ability to dissociate the lithium salt. This polymer based electrolyte matrix is preferably in the form of a membrane (e.g. between 1 and 100 μm) lithium ion conducting organic electrolyte.

The electrolyte matrix preferably is in the form or a membrane, preferably has a thickness of less than 100 μm, more preferably equal or less than 60 μm and even more preferably equal or less than 50 μm. The membrane is preferably at least 1 μm thick.

Li-ion conducting inorganic fibres and/or particles provide a unique combination of mechanical strength, high temperature and chemical stability, whilst enhancing lithium-ion conductivity within the energy storage device relative to conventional polymeric or inorganic fibres and/or particles used within energy storage devices.

In a seventh aspect of the present invention, there is provided a silicate composition comprising a formula:

where
M1 is selected from the group consisting of alkaline metals (e.g Na, K), alkaline earth metals (e.g. magnesium, calcium, strontium, barium), Ti, Mn, Zr, Fe, La, Ce, Ta, Nb, V and combinations thereof;
M2 is selected from the group consisting of B, Al, Ga, Ge or combinations thereof;
v, y and z are greater than 0;
w and/or x or greater than 0;
y≥x; and
wherein at least 90 wt % or at least 95 wt % or at least 99 wt % of the composition comprises $Li_vM1_wM2_xSi_yO_z$.

The composition is preferably in the form a fibre, a particle or a film.

Preferably the film is a glassy (i.e. formed from a molten mass) film. In another embodiment the film is an amorphous film (e.g. produced by sputter techniques). The film preferably has a thickness of less than 200 μm, preferably less than 100 μm and even more preferably less than 50 μm. The film is preferably at least 1 μm thick.

In a preferred embodiment M1 comprises or consists of Zr and/or Ti.

In another preferred embodiment, M2 comprises Al.

This aspect of the invention encompasses all embodiments described within the previous aspects of the inventions and throughout the specification.

The composition of the silicate preferably comprises at least 1.0 wt % lithium oxide ($Li_2O$), more preferably at least 2.0 wt % or at least 5.0 wt % or at least 8.0 wt % or at least 10 wt % or at least 12 wt % or at least 15 wt % or at least 20 wt % or at least 25 wt % or at least 30 wt % lithium. The lithium content is preferably less than 50 wt % or less than 40 wt % or less than 30 wt % or less than 20 wt % or less than 18 wt % or less than 15 wt % or less than 12 wt % or less than 10 wt % or less than 8 wt %. Too high a lithium content may affect the ability to form a fibre/particle of sufficient mechanical properties. High lithium content has also been found to be detrimental to the lithium ion conductivity of some silicate compositions.

In an eighth aspect of the present invention there is provided a silicate composition comprising:
1 to 30 wt % $Li_2O$;
10 to 60 wt % $ZrO_2$;
20 to 80 wt % $SiO_2$;
The sum of $Li_2O+ZrO_2+SiO_2$ is preferably greater than 50 wt %, more preferably greater than 80 wt % and even more preferably greater than 95 wt %.

Preferably, the composition further comprises 0 to 50 wt % (and more preferably 0 to 30 wt %) of other components (preferably excluding phosphorous).

In a preferred embodiment, the silicate composition comprises:
4 to 12 wt % $Li_2O$;
15 to 55 wt % $ZrO_2$;
50 to 75 wt % $SiO_2$; and
0 to 30 wt % other components.

In a more preferred embodiment, the silicate composition comprises:
4 to 10 wt % $Li_2O$;
18 to 25 wt % $ZrO_2$;
65 to 75 wt % $SiO_2$;
0 to 13 wt % other components.

The other components are preferably oxide components.

In one embodiment, the other components are less than 10 wt % or less than 8 wt % or less than 5 wt %. In some embodiments, the other components are greater than 0. The other components preferably consist of impurities.

The other oxide components preferably comprises $TiO_2$ and/or $Al_2O_3$

In one embodiment, the composition comprises between 0.5 and 50 wt % and more preferably between 1.0 and 20 wt % of further oxide components. The addition of the oxide components may be used to improve conductivity, mechanical properties, electrochemical stability or processability during manufacture.

The silicate composition preferably further comprises one or more of the oxide forms of alkaline metal, alkaline earth metal, boron, sodium, magnesium, aluminium, phosphorous, potassium, tantalum, gallium, strontium, germanium, barium, lanthanum, calcium, vanadium, manganese, iron, cerium, niobium and titanium. Hafnium may be present as an impurity, particularly when the composition comprises zirconium.

In one embodiment, the sum of the abovementioned oxides (including $Li_2O+ZrO_2+SiO_2$) is preferably at least 90 mol % and more preferably at least 95 mol % (or wt %) and even more preferably at least 98 mol % (or wt %). Additional components are preferably only present as impurities.

In a preferred embodiment, the silicate composition comprises less than 1.0 wt % phosphorous oxide and more preferably does not comprise phosphorus oxide or only comprises phosphorous oxide as an impurity. Phosphorus oxide ($PO_x$) is reported to be thermodynamically unstable with lithium metal. Furthermore, $PO_x$ containing melts are highly corrosive to manufacturing equipment, making them unsuitable for large scale production of silicate compositions.

The silicate composition preferably comprises lithium zirconium silicate. Preferred lithium zirconium silicates include the crystalline and/or amorphous form of $Li_2ZrSi_6O_{15}$ and combinations thereof. Amorphous lithium zirconium silicate has been found have particularly high ionic conductivity.

A preferred composition of lithium zirconium silicate compositions (preferably particles or fibres or film) comprise in the range of:
1 to 30 wt % and more preferably 5 to 25 wt % $Li_2O$ (or 3 wt % to 15 wt % $Li_2O$);
10 to 60 wt % and more preferably 20 to 50 wt % $ZrO_2$ (or 15 wt % to 55 wt % $ZrO_2$); and
20 to 80 wt % and more preferably 30 to 70 wt % $SiO_2$ (or 40 wt % to 65 wt % $SiO_2$)

$ZrO_2$ is preferably at least 12 wt % or at least 14 wt % or at least 16 wt % or at least 18 wt %. $ZrO_2$ is preferably at no more than 45 wt % or no more than 40 wt % or no more than 35 wt % or no more than 30 wt %.

$SiO_2$ is preferably at least 35 wt % or 45 wt % or at least 50 wt % or at least 55 wt % or at least 60 wt %. $SiO_2$ is preferably at no more than 78 wt % or no more than 76 wt % or no more than 74 wt % or no more than 72 wt %.

In some embodiments, the lithium zirconium silicate composition comprises between greater than 0 and 30 wt % and preferably between 0.5 and 12 wt % $TiO_2$ and/or $Al_2O_3$.

The sum of $Li_2O+ZrO_2+SiO_2$ is preferably greater than 50 wt %, more preferably greater than 80 wt % and even more preferably greater than 95 wt % or greater than 98 wt % or greater than 99 wt % or greater than 99.5 wt %. The sum of the other components is preferably between 0.5 and 50 wt % and more preferably 1.0 and 20 wt %.

Preferred lithium alkaline earth silicates include the crystalline, glassy and/or amorphous form of $Li_2MgSiO_4$, $Li_2CaSiO_4$, $Li_2SrSiO_4$ and $Li_2BaSiO_4$ and combinations thereof.

A preferred composition of lithium alkaline earth silicates composition comprises in the range of:
1 to 40 wt % and more preferably 5 to 30 wt % $Li_2O$;
20 to 80 wt % and more preferably 20 to 50 wt % alkaline earth oxides; and
5 to 60 wt % and more preferably 30 to 70 wt % $SiO_2$ The alkaline earth oxides are preferably selected from MgO, CaO, BaO or SrO and combinations thereof.

The sum of $Li_2O$+alkaline earth oxides+$SiO_2$ is preferably greater than 50 wt %, more preferably greater than 80 wt % and even more preferably greater than 95 wt %.

A preferred composition of lithium titanate silicate composition comprises:
1 to 30 wt % and more preferably 5 to 20 wt % $Li_2O$; and
20 to 90 wt % and more preferably 20 to 60 wt % $TiO_2$ The sum of $Li_2O$+$TiO_2$ is preferably greater than 40 wt %, more preferably greater than 60 wt %

A preferred lithium titanium silicate includes the crystalline, glassy and/or amorphous form of $LiTiSi_2O_6$.

A preferred composition of lithium aluminium silicate composition comprise:
1 to 20 wt % and more preferably 4 to 15 wt % $Li_2O$;
10 to 75 wt % and more preferably 15 to 65 wt % $Al_2O_3$; and
20 to 80 wt % and more preferably 25 to 70 wt % $SiO_2$ The sum of $Li_2O$+$Al_2O_3$+$SiO_2$ is preferably greater than 50 wt %, more preferably greater than 80 wt % and even more preferably greater than 95 wt %.

Preferred lithium aluminium silicates include the crystalline, glassy and/or amorphous form of $Li_3Al_3SiO_8$, $LiAlSi_2O_6$, $LiAlSi_4O_{10}$ or $LiAlSiO_4$ and combinations thereof.

Other lithium ion conductive compounds which may be integrated into the composition (e.g. particles, film or fibres), or form part of inorganic fillers/binders used in the formation of separators or composite electrolytes, include, but are not limited to:
1. Nitrides
   i. Amorphous
      a) LiPON
   ii. Crystalline
      a) $Li_3N$ (alpha or beta)
2. Oxides
   i. Amorphous
      a) $xLi_2O.(1-x)SiO_2$ where x is between 0 and 1
      b) $xLi_2O.(1-x)B_2O_3$ where x is between 0 and 1
   ii. Crystalline:
      a) Lithium Superionic Conductors (LISICON) such as
         a. $Li_{14}A(BO_4)_4$ where A=Zn, Zr, Cr or Sn and B=Ge, Si, S or P
         b. $(1-x)Li_4SiO_4.xLi_3PO_4$ where x is between 0 and 1
      b) (Structure of) Sodium Superionic Conductors (NASICON) such as
         a. $Li_{(1+x)}A_xB_{2-x}(PO_4)_3$ where A=Al, Y, Ga, Cr, In, Fe, Sc or La and B=Ti, Ta, Zr, Ge, Sn, Si, Fe, V or Hf and x is between 0 and 1
         b. Main examples are LATP and LAGP
      c) Perovskite
         a. $Li_{3x}A_{(2/3)-x}BO_3$ where A=La, Al, Mg, Fe or Ta and B=Ti, Pr, Nb or Sr and x is between 0 and 2/3.
         b. Main example is LLTO
      d) Garnet
         a. $Li_{3+x}A_3B_2O_{12}$ where A=La, Ca, Sr, Ba or K and B=Ta, Te, Nb or Zr and x is between 2 and 4 and is contingent upon the materials for A and B
         b. $Li_{7-x}A_3B_{2-x}C_xO_{12}$ where A=La, Ca, Sr, Ba or K, where B=Ta, Te, Nb or Zr, where C=Ta, Te, Nb or Zr and where x is between 0 and 2
         c. Preferably LLZO ($Li_7La_3Zr_2O_{12}$)
3. Sulfides
   i. Amorphous
      a. $xLi_2S.(1-x)P_2S_5$ where x is between 0 and 1
      b. $xLi_2S.(1-x)Al_2S_3$ where x is between 0 and 1
      c. $xLi_2S.(1-x)SiS_2$ where x is between 0 and 1
      d. LiPOS
   ii. Crystalline
      1. $Li_{10}AB_2S_{12}$ where A is Ge, Sn or Pb and B is P, Si or Al
         a. Preferably $Li_{10}GeP_2S_{12}$
4. Hydrides
   i. Single complex anion of form $Li(XH_n)$ where $XH_n$ is a complex anion such as $NH_2$, BH4 and $AlH_4$
   ii. Double complex anion of form $Li(XH_n).aLi(YH_n)$ where $XH_n$ and $YH_n$ are identical or different complex anions such as $NH_2$, $BH_4$ and $AlH_4$, and a is the ratio of their combination
   iii. Combination with halide-$Li(XH_n)$-LiZ where $XH_n$ is a complex anion such as $NH_2$, $BH_4$ and $AlH_4$ and Z is a halide such as Cl—, Br— or I—.
   iv. Main example is $LiNH_2.3LiBH_4$
5. Halides
   i. LiI, spinel $Li_2ZnI_4$ and anti-perovskite $Li_3OCl$
6. Other oxide compositions are described below: lithium lanthanum titanates; lithium lanthanum zirconates; lithium manganates; lithium phosphates; lithium titanates; lithium titanium phosphates; and lithium zirconium phosphates.

In a ninth aspect of the present invention, there is provided a process to produce the silicate composition of any one of the preceding aspects, in the form of fibres or nanowires comprising the steps of:
A. Obtaining a mixture of silicates and metal oxides or precursors thereof;
B. Melting the mixture to form a flowable liquid;
C. Generating fibres or nanowires from the flowable liquid.

In a tenth aspect of the present invention, there is provided a process to produce the silicate composition of any one of the preceding aspects, in the form of a film comprising the steps of:
A. Obtaining a mixture of silicates and metal oxides or precursors thereof;
B. Raising the temperature of the mixture sufficiently above the softening temperature to form a molten mass;
C. Mechanically working the molten mass above the softening temperature to produce a glassy film.

The mechanical working of the molten mass is preferably achieved through rollers or presses.

The mixture preferably comprises zircon ($ZrSiO_4$). Zircon is readily available and it a good source of both network formers and network modifiers.

The generation of fibres or nanowires is preferably achieved through conventional melt techniques as previously described.

The fibres or nanowires may be further processed to remove shot content and/or separate out lower diameter fibres (e.g. through air classification).

In a eleventh aspect of the present invention, the fibres or nanowires or glassy film produced in the ninth or tenth aspects of the present invention are milled to an aspect ratio of less than 3 to produce particles.

Crystalline Form

The proportion of amorphous versus crystalline material may be adjusted through heat treatment techniques as known by those skilled in the art.

In some embodiments, the amorphous phase content is in the range of 0 and 100 wt %, preferably greater than 0 and less than 90 wt % and more preferably greater than 30 wt % and less than 70 wt %.

In some embodiments, the composition may have a crystalline content of at least 40 wt %, preferably at least 50 wt %, more preferably at least 70 wt % and even more preferably at least 90 wt %.

In some embodiments, the composition may have a crystalline content of less than 50 wt %, preferably less than 30 wt %, more preferably less than 10 wt % and even more preferably less than 5 wt %. In a preferred embodiment, no crystalline content is detectable.

In some embodiments, the composition is in the form of fibres which have a crystalline surface layer and an amorphous core layer.

Fibre Dimensions and Characteristics for Separators, Electrolytes and Matrices Thereof The fibre preferably has a geometric or arithmetic mean fibre diameter of less than 20.0 μm or less than 10.0 μm or 5.0 μm and more preferably less than 3.0 μm and even more preferably less than 2.0 μm or less than 1.5 μm or less than 1.1 μm. Fibres are preferably of diameter (geometric or arithmetic mean) of at least 0.2 μm or 0.3 μm or 0.5 μm or 0.8 μm or 1.0 μm or 1.2 μm and even more preferably at least 1.4 μm to have sufficient mechanical strength and to be manufactured economically. This fibre diameter range is particularly suited in combination with liquid electrolytes. A low fibre diameter facilitates the production of a thinner separator layer and increases the ionic conductive surface area of the separator.

A melt formable composition preferably is able to produce fibres using melt techniques which have a geometric or arithmetic mean fibre diameter of less than 20.0 μm and preferably less than 10 μm; and a shot content, prior to shot cleaning, of less than 60 wt % and preferably less than 50 wt %.

The fibre is preferably cleaned of shot (>45 μm), with the shot content after further processing to reduce shot, the shot content is preferably less than 10.0 wt % or less than 10 wt % or less than 8.0 wt % or less than 6.0 wt % or less than 5 wt % or less than 4.0 wt %.

The geometric or arithmetic mean fibre length is preferably greater than 10 μm more preferably greater than 100 μm, even more preferably greater than 1 mm, yet even more preferably greater than 3 mm and most preferably greater than 5 mm. The geometric or arithmetic mean fibre length is preferably less than 100 mm, more preferably less than 25 mm and even more preferably less than 10 mm or less than 1 mm.

The fibre preferably has an aspect ratio of at least 3 or 10 or 20 or 30 and more preferably at least 100. For the purposes of the present invention, inorganic particles are defined as particles having an aspect ratio of less than 3.

In a first special aspect of the present invention, there is provided a method for producing inorganic particles comprising the steps of:
A. forming inorganic fibres having an arithmetic mean diameter of below 10.0 μm and;
B. milling the inorganic fibres to form milled particles with an aspect ratio of less than 50% of the aspect ratio of the inorganic fibres.

Preferably, the standard deviation of the largest milled particle's dimension is greater than the standard deviation of the smallest milled particle's dimension.

In one embodiment, the standard deviation of the smallest milled particle's dimension is less than 2.0 μm, preferably less than 1.5 μm, and even more preferably less than 1.0 μm.

The fibres may be formed through any conventional method, including sol-gel or melt techniques.

The aspect ratio is defined as the ratio of a particle's largest dimension relative to the particle's smallest dimension.

Through forming particles from fibres, the resultant particles have a more uniform dimension, relative to particles formed from non-fibrous material (e.g. glass lumps). Through being able to control two of the three dimensions of the particles, additional processing steps can be performed to change more precisely the particle's microstructure or crystallinity. For example, with the defined particles having a relatively uniform distance between the surface and a central axis or centre of the particle (compared to particles not formed from inorganic fibres), the fibres or particles may be exposed to treatment to control grain size or levels of crystallinity. Preferably, the treatment includes heat and pressure treatment over a designated period of time.

Fibres may be formed which are amorphous. Preferably, the fibres (or particles) are heat treated to partially (e.g. between 20 wt % and 80 wt %) crystallise the composition. Obtaining a consistent level of partial crystallisation is particularly difficult if the materials have significant variations between the distance of the particle/fibre's surface and its centre or central axis.

Preferably, the method further comprises the step, preferably prior to Step B, of heat treating the fibres. This step preferably adjusts the crystalline state or grain size within the fibres. The heat treatment process is preferably performed continuously. To assist in the continuous processing of the fibres prior to milling, the fibres are preferably in the form of a blanket. The blanket preferably has a density of less than 300 kg/m$^3$, more preferably less than 200 kg/m$^3$ and even more preferably less than 100 kg/m$^3$. A lower density blanket enables the surfaces of the fine diameter fibres to be heated at a faster rate by the circulating hot gases.

In addition to heat treating, additional processing steps may also include coating of the fibres. Conveniently, the coating step can be applied immediately after the formation of the fibres.

The fibres may include one or more compositions. Preferably the compositions are lithium ion conductive fibres as previously described in this application.

The milled particles of the method may be used to form membranes for use in energy storage devices.

In a second special aspect of the present invention, there is provided particles produced by the first special aspect of the present invention.

Ion Conductivity

Grain conductivity ($\sigma_g$) of a material relates to the ionic conductivity through a single grain or crystallite and is dependent on multiple factors, including but not limited to the composition, crystallinity and temperature. The total conductivity ($\sigma_t$) incorporates the grain conductivity and all interfaces between grains, crystallites and other components of the organic-silicate composites or electrolyte matrix and other combinations of the silicate compositions.

Ion conductivity (grain) at 30° C. or room temperature for the silicate compositions is preferably at least $1.0 \times 10^{-6}$ S cm$^{-1}$ or $5.0 \times 10^{-6}$ S cm$^{-1}$ or $6.0 \times 10^{-6}$ S cm$^{-1}$ or $7.0 \times 10^{-6}$ S cm$^{-1}$ or $8.0 \times 10^{-6}$ S cm$^{-1}$ or $9.0 \times 10^{-6}$ S cm$^{-1}$ or $1.0 \times 10^{-5}$ S cm$^{-1}$ or $1.2 \times 10^{-5}$ S cm$^{-1}$ or $1.4 \times 10^{-5}$ S cm$^{-1}$ or $1.5 \times 10^{-5}$ S cm$^{-1}$ or $2.0 \times 10^{-5}$ S cm$^{-1}$ or $3.0 \times 10^{-5}$ S cm$^{-1}$ or $4.0 \times 10^{-5}$ S cm$^{-1}$ or $5 \times 10^{-5}$ S cm$^{-1}$ or $1 \times 10^{-4}$ S cm$^{-1}$ or $5.0 \times 10^{-4}$ S cm$^{-1}$ or $1.0 \times 10^{-3}$ S cm$^{-1}$.

Ion conductivity (total) at 30° C. or room temperature for organic-silicate compositions, composites or electrolyte matrixes (e.g. silicate composition-polymer composite) is at least $5.0 \times 10^{-5}$ S cm$^{-1}$ or $1.0 \times 10^{-4}$ S cm$^{-1}$ or $2.0 \times 10^{-4}$ S cm$^{-1}$ or $5.0 \times 10^{-4}$ S cm$^{-1}$ or $7.0 \times 10^{-4}$ S cm$^{-1}$.

Mechanical Properties

During the assembly of the battery and during their use, separators and composite membranes are subjected to a degree of mechanical and thermal stress.

Tensile Strength

Preferably, membranes comprising fibres under the scope of the present invention comprise a tensile strength, on a wet and/or dry basis, of at least 1 MPa, or at least 2 MPa, or least 3 MPa, or least 4 MPa, or at least 5 MPa, or at least 8 MPa, or at least 10 MPa, or at least 20 MPa.

In polymer composite membranes, the tensile strength may be influenced by the polymer and other characteristics, such as molecular weight. The inclusion of the silicate composition in the form of particles and/or fibres preferably results in an increase in the tensile strength of the membrane, relative to the polymer membrane without the silicate composition of at least 50% or at least 100% or at least 150% or at least 200% or at least 300% or at least 400%. Irrespective of the increase in ionic conductivity that the silicate composition may impart on a polymer composite, the addition of the silicate composition also provides significant mechanical enhancement which benefits the utility of the electrolyte system within the energy storage device.

Shrinkage

The fibres preferably have a shrinkage of no more than 10.0% or 5.0% or 3.0% and more preferably no more than 1.0% or 0.5% or 0.2% at 800° C. and preferably 900° C. and even more preferably at 1000° C. At 1100° C. the fibres have a shrinkage of preferably no more than 4.0% and preferably no more than 2.0% or 0.5%. At 1200° C. the fibres have a shrinkage of preferably no more than 5.0% and preferably no more than 2.0% or 1.0%. In an alternative embodiment, the fibres have a shrinkage of no more than 10.0% or 5.0% or 3.0% and more preferably no more than 1.0% or 0.5% or 0.2% at 700° C. or 750° C. Preferably, separators (or composite materials) comprising the fibres have a similar shrinkage performance (i.e. within 50% of the performance of the fibres used therein.) Low shrinkage ensures that the resultant separator is able to separate the electrodes and avoid a short circuit within the battery even at elevated temperatures.

It will be understood, that features of one aspect of the invention may be appropriately utilised in another aspect of the invention.

A lithium (metal) energy storage device will be taken to be inclusive of a lithium (metal) ion energy storage device.

Reference to fibres will be inclusive of nanowires unless otherwise stated.

References to "a" or "an" should be interpreted broadly to encompass one or more of the features specified. Thus, in the case of "a fibre", the device may include one or more fibres.

In this application, except where the context requires otherwise due to express language or necessary implication, the word "comprise" or variations such as "comprises" or "comprising" is used in an inclusive sense, i.e. to specify the presence of the stated features but not to preclude the presence or addition of further features.

"Substantially free of phosphorous" means no intentional addition of phosphorous, with any phosphorous present being in the form of impurities.

For the purposes of the present invention an electrolytic medium encompasses solvents, polymers and gels which are able to dissolve or disperse an electrolytic salt.

Shot is defined as the product of the fiberisation process, determined: 10-25 g of fibre is crushed 4 times in a 64 mm diameter die at a pressure of 800 psi, stirring between crushes. At least 10 g of the crushed fibres are placed on a 45 micron sieve and sucked through the jet air sieve for 180 seconds. Material remaining in the sieve was considered to be shot and weighed to assess the shot content by weight percentage.

A conventional rechargeable lithium-ion cell comprises two electrodes, prevented from contacting each other electrically by a thin separator. The cell is filled with a liquid electrolyte through which conduction of lithium ions between the two electrodes can occur. The structure of the separator is engineered to maximize this conduction while minimizing the probability of a short-circuit. In other constructions of lithium ion cells, both the separator and the liquid electrolyte are replaced with a polymer or a gel or a solid ceramic or a combination of these, separating the electrodes and carrying the dual function of being both ionically conductive and electrically insulating. Another variation is termed a hybrid construction wherein liquid is present between one electrode and the polymer or gel or solid ceramic or combination, but the liquid is not present at or contacting the other electrode. Polymers or gels are usually loaded with conductivity enhancing materials to enhance conductivity and mechanical strength. With these many variations of cell construction, the terms "separator" and "electrolyte" are frequently used interchangeably, especially when the electrolyte is of a polymer or gel or solid ceramic type. In this document, where the terms "separator" or "electrolyte" are used, this duality of terminology is implicit.

Composites and matrixes may be interchangeably used to reference compositions comprising silicate compositions in combination with an organic composition which may function as an electrolyte and/or binder.

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

For the avoidance of doubt it should be noted that in the present specification the term "comprise" in relation to a composition is taken to have the meaning of include, contain, or embrace, and to permit other ingredients to be present. The terms "comprises" and "comprising" are to be understood in like manner. It should also be noted that no claim is made to any composition in which the sum of the components exceeds 100%.

Where a patent or other document is referred to herein, its content is incorporated herein by reference to the extent permissible under national law.

It will be appreciated that other material in addition to the specified content or formula relates to additional materials in the composition which may relate to additives, including components which have been substituted for M1 and/or M2, as would be appreciated by those skilled in the art.

Further it should be understood that usage in compositions of the names of oxides (e.g. alumina, silica, quicklime, calcia, strontia) does not imply that these materials are supplied as such, but refers to the composition of the final fibre expressing the relevant elements as oxides. The materials concerned may be provided in whole or in part as mixed oxides, compounded with fugitive components [e.g. supplied as carbonates] or indeed as non-oxide components [e.g. as halides or sulphides].

BRIEF DESCRIPTION OF THE FIGURES

FIG. 4 is a SEM image of Sample 4a.

DETAILED DESCRIPTION

The silicate compositions of the present invention preferably form part or all of a separator or part or all of solid electrolyte or part of an inorganic/organic electrolyte matrix (e.g. polymer composite within a lithium ion energy storage device, such as a battery or capacitor).

The silicate composition of the present invention may be in any form (e.g. fibre, particle and/or film) and manufactured via any suitable means and ground or milled to the desired particle size distribution. When formed as a particle, the mean particle size will vary with application, but is preferably between 1 nm and 100 μm and more preferably between 10 nm and 5 μm.

Energy Storage Device Components

The chemically and thermally inert nature of the silicate compositions enable them to be compatible to most battery systems.

Separator

In one embodiment, lithium zirconium silicate fibres (and/or particles) of the present invention are integrated into a separator (or inorganic-organic hybrid membrane). The fibres preferably form a non-woven web from which the separator is produced. In one embodiment the fibres are substantially orientated in the same plane as the web, such that within a battery the fibres are substantially parallel to the electrodes. In other embodiments, the fibres are randomly oriented.

In one embodiment, the configuration silicate fibres form a tortuous lithium ion pathway from the anode side of the separator to the cathode side. Preferably the silicate fibres contact one or more adjacent fibres within the separator to form a plurality of lithium ion pathways. The separators preferably also comprise lithium ion conducting inorganic fillers. The fillers may be used to control the separator porosity in addition to creating a plurality of continuous ionic conductive pathways. Despite the tortuous pathways that the fibres produce, connection between fibres and inorganic particles enable lithium ion transfer bridges to be formed between fibres and particles thereby enabling more direct lithium ion transfer across the separator.

In a preferred embodiment, two or more inorganic fibres and/or inorganic particles form a lithium ion conductive pathway across the separator (inorganic-organic hybrid membrane).

The composition of the separator (hybrid membrane) preferably comprises in the range of:
  2 to 100 wt % or 5 to 100 wt %, more preferably 30 to 98 wt %, even more preferably 40 to 95 wt %, yet even more preferably 50 to 90 wt %, yet even more preferably 60 and 80 wt % silicate fibres;
  0 to 95 wt % or 1 to 90 wt %, more preferably 5 to 60 wt %, even more preferably 10 to 50 wt %, yet even more preferably 15 to 40 wt % and most preferably 20 and 40 wt % inorganic particles, preferably silicate particles; and
  0 to 90 wt % or 0 to 50 wt %; more preferably 3 to 20 wt % and even more preferably 5 to 10 wt % binder In a preferred embodiment, the fibre content is between 2 wt % and 10 wt % (e.g. separator comprising silicate fibres and PEO or PAN).

In one embodiment the composition of the silicate fibres are the same as the composition of the silicate inorganic particles. For the purposes of the present invention, the "same composition" means specific oxide components are within 1 wt % or 10 wt % of each other, whichever is greater.

The inorganic particles preferably have a mean diameter of less than 100 microns and more preferably less than 50 microns, yet even more preferably less than 20 microns and more preferably less than 10 microns. The mean diameter of the particles is typically at least 10 nm and more preferably at least 100 nm. A smaller particle size enables the separators to be thinner and increases the ionic conductive surface area of the separator.

The binder may be inorganic or organic. The inorganic binders preferably have a softening temperature below the softening temperature of the inorganic fibres. In some embodiments, the inorganic binder is a lithium ion conducting particle.

Suitable organic binders may be selected from the group consisting of but not limited to polyvinylidene fluoride (PVdF), polyvinylidene fluoride-hexafluoropropylene copolymer (PVdF-HFP), Polyphenylene sulphide (PSS), polyethylene oxide (PEO), polyacrylonitrile (PAN), polytetrafluoroethylene, polyacrylate, styrene-butadiene rubber, polylactic acid, polyvinyl alcohol, polyacrylonitrile, poly (methyl methacrylate) and polysaccharides (for example carboxymethylcellulose (CMC)), and mixtures and copolymers thereof.

In one embodiment, the organic binders are preferably polymers having a relatively high melting temperature (e.g. preferably >150° C. and more preferably greater than 200° C.) to enable the separator still effectively to function at elevated temperatures.

The separator preferably forms a composite membrane (or matrix) with a solid, gel or liquid electrolyte.

The ceramic fibre separator may be prepared by a traditional wet winding process. The lithium ion conducting fibres, were combined with a binder (for example carboxymethyl cellulose (CMC)) and a dispersant (for example polyethylene oxide (PEO)) added. The proportion of the materials (e.g. weight ratio of 90:7:3 respectively) may be dissolved into an amount of distilled water or organic solvent under a continuous stir, whereas the viscosity of the solution may be controlled by the binder contents. Following stirring for 8 h, the mixed solution may be placed onto the forming wire to form a membrane, followed by overnight drying at 120° C. under vacuum. Consequently, the membrane thickness was controlled by an extended roller.

Alternatively, the separator may be made in accordance with the general methodology disclosed in U.S. Pat. No. 9,637,861, with the exception that the inorganic fibres of the present invention partially and preferably completely replace microfibers. Additionally, the nanofibers can be partially or completely replaced with fillers and/or binders. Fillers and/or binders are preferably added to control the porosity of the separator. The fillers and binders may also increase the surface area of lithium ion conductive pathways. In one embodiment, organic binders are used to bind lithium ion conductive particles within a non-woven fibrous web.

The resultant separators preferably exhibit one or more of the following characteristics:
- porosity ranging from about 70% to about 98%;
- peel strength from about 0.03 kN m$^{-1}$ to about 0.50 kN m$^{-1}$;
- an ASTM Gurley Number in the range of about 30 to 150 sec. ASTM Gurley Number refers to the time it takes for 10 cc of air at 12.2 inches of water to pass through one square inch of membrane;
- a liquid absorbency ranging from about 200% to about 1300%.
- an areal density ranging from about 0.2 g m$^{-2}$ to about 3 g m$^{-2}$.
- A thickness of less than 100 µm preferably less than 50 µm and more preferably less than 30 µm.

Polymer Component

In some embodiments, the separator or hybrid membrane preferably comprises a polymer component. The polymer component may function to assist in the formation of the separator (e.g. action as a binder of the inorganic fibres) and/or enhance the properties of the separator (e.g. toughness and/or enhance porosity).

To avoid the polymer component negatively affecting the functioning of the separator (e.g. safety or conductivity), the proportion of the polymer component is preferably in the range of 0.1 wt % to 50 wt %, more preferably 2 wt % to 40 wt % and even more preferably 5 wt % and 25 wt %. In preferred embodiments, the polymer content is less than 20 wt %, more preferably less than 10 wt % and yet even more preferably less than 5 wt %.

In embodiments in which the inorganic fibres or particles form part of a polymer based separator or solid (i.e. polymer) electrolyte, the proportion of polymer (or polymer/lithium ion salts) is preferably at least 60 wt %, more preferably at least 80 wt % and even more preferably at least 85 wt % and yet even more preferably at least 90 wt % of the total of the separator or solid electrolyte. In this embodiment, the silicate composition fibres or particles serve to enhance the mechanical and conductive properties of the polymer.

The polymer may comprise polyvinylidene fluoride (PVDF), poly (vinylidene fluoride-hexafluoropropylene) (PVDF-HFP)), Polyphenylene sulphide (PPS), polymethyl methacrylate (PMMA), polyacrylonitrile (PAN), polyimide (PI), polyvinyl pyrrolidone (PVP), polyethylene oxide (PEO), polyvinyl alcohol (PVA), polylactic acid (PLA), polysaccharides (for example carboxymethyl cellulose (CMC)), styrene-butadiene rubber (SBR) and combinations thereof.

In one embodiment, the polymer component forms part of a hybrid organic/inorganic fibre, preferably produced via electro-spinning techniques, such as those disclosed in U.S. Pat. No. 8,846,199.

Electrolyte

The silicate composition of the present invention preferably forms part of a lithium ion conductive electrolyte (including a solid, liquid or gel electrolyte). The electrolyte is preferably a non-aqueous solvent, polymer or gel having an electrolytic salt dissolved or dispersed therein to form an electrolytic medium. The non-aqueous electrolytic medium of the present invention is not particularly limited as long as the electrolyte salt can be dissolved or dispersed in it, and for example may be any one of many publicly known electrolytic mediums used for energy storage devices.

Polymer Based

In one embodiment, the silicate composition forms a matrix with a lithium ion conducting organic electrolyte, such as Solid Polymer Electrolytes (SPE). SPEs may include amorphous or semi-crystalline PEO, PPS, PAN, polyvinyl chloride (PVC), PVDF, PMMA, poly(vinylidene fluoride-hexafluoro propylene) P(VDF-HFP), PVA, PLA, PVP and combinations thereof. The polymers may be selected from ionically (e.g. lithium ion) conductive polymers such as polyethers, polysaccharides, polyacrylates, polyamines, polyimides, polyamides and other polar groups including heteroatom systems.

In a preferred embodiment the SPE comprises PEO, PAN or PPS. Suitable crystalline SPE include 6PEO:LiAF$_6$ where A is P, As or Sb.

When the above-mentioned polymers or polymer gels are used as a medium to dissociate the electrolyte salt, one of the following methods may be used. That is, a method in which a solution obtained by dissolving an electrolyte salt in a non-aqueous liquid solvent is added dropwise to a polymer formed into a film by a publicly known method to impregnate the polymer with the electrolyte salt (e.g. lithium salt) and the non-aqueous solvent or to support the electrolyte salt and the non-aqueous solvent; a method in which a polymer and an electrolyte salt are melted at a temperature of a melting point of the polymer or higher, mixed, and then formed into a film, and the film is impregnated with a non-aqueous solvent (these are gel electrolytes); a method in which a non-aqueous electrolytic solution is obtained by dissolving an electrolyte salt in an organic solvent in advance is mixed with a polymer, and the resulting mixture is formed into a film by a casting method or a coating method, and an organic solvent is volatilized; and a method in which a polymer and an electrolyte salt are melted at a temperature of a melting point of the polymer or higher, mixed, and then molded (intrinsic polymer electrolyte) may be used to obtain the film.

Inorganic Based

In an alternative embodiment, the silicate composition forms a matrix with a Composite Solid Electrolyte (CSE). CSEs may include SPE and non-Li based materials such as TiO$_2$, ZrO$_2$, Al$_2$O$_3$, Metal Organic Frameworks (MOF's), CNT's, graphene.

Alternatively, the solid electrolyte may consist of the silicate composition.

Liquid Based

Non-aqueous solvents such as cyclic carbonates described later and a solvent other than a cyclic carbonate; and a medium such as a polymer or a polymer gel which is used in place of the solvent, can be used.

As the non-aqueous solvent, it is preferred that such a solvent exhibits high dielectric constant, can readily dissolve an electrolyte salt, has a boiling point of not less than 60° C., and is electrochemically stable during operation of the energy storage device. The non-aqueous solvent is more preferably an organic solvent of which water content is small. Such an organic solvent is exemplified by an ether solvent such as ethylene glycol dimethyl ether, ethylene glycol diethyl ether, tetrahydrofuran, 2-methyltetrahydrofuran, 2,6-dimethyltetrahydrofuran, tetrahydropyran, crown ether, triethylene glycol dimethyl ether, tetraethylene glycol dimethyl ether, 1,4-dioxane and 1,3-dioxolan; a chain carbonate ester solvent such as dimethyl carbonate, ethyl methyl carbonate, diethyl carbonate, diphenyl carbonate and methyl phenyl carbonate; a saturated cyclic carbonate solvent such as ethylene carbonate, propylene carbonate, 2,3-dimethylethylene carbonate (i.e. 2,3-butanediyl carbonate), 1,2-butylene carbonate and erythritan carbonate; a cyclic carbonate solvent having an unsaturated bond, such as vinylene carbonate, methylvinylene carbonate (MVC; i.e., 4-methyl-1,3-dioxole-2-one), ethylvinylene carbonate (EVC; i.e., 4-ethyl-1,3-dioxole-2-one), 2-vinylethylene carbonate (i.e., 4-vinyl-1,3-dioxolane-2-one) and phenylethylene carbonate (i.e., 4-phenyl-1,3-dioxolane-2-one); a fluorine-containing cyclic carbonate solvent such as fluoroethylene carbonate, 4,5-difluoroethylene carbonate and trifluoropropylene carbonate; an aromatic carboxylate ester solvent such as methyl benzoate and ethyl benzoate; a lactone solvent such as .gamma.-butyrolactone, .gamma.-valerolactone and .delta.-valerolactone; a phosphate ester solvent such as trimethyl phosphate, ethyl dimethyl phosphate, diethyl methyl phosphate and triethyl phosphate; a nitrile solvent such as acetonitrile, propionitrile, methoxypropionitrile, glutaronitrile, adiponitrile, 2-methylglutaronitrile, valeronitrile, butyronitrile and isobutyronitrile; a sulfur compound solvent such as dimethyl sulfone, ethyl methyl sulfone, diethyl sulfone, sulfolane, 3-methylsulfolane and 2,4-dimethylsulfolane; an aromatic nitrile solvent such as benzonitrile and tolunitrile; nitromethane, 1,3-dimethyl-2-imidazolidinone, 1,3-dimethyl-3,4,5,6-tetrahydro-2 (1H)-pyrimidinone, 3-methyl-2-oxazolidinone and the like.

Among the exemplified solvents, a carbonate solvent such as a chain carbonate ester solvent, and a cyclic carbonate ester solvent, a lactone solvent and an ether solvent are preferred, dimethyl carbonate, ethyl methyl carbonate, diethyl carbonate, ethylene carbonate, propylene carbonate, .gamma.-butyrolactone and .gamma.-valerolactone are more preferred, a carbonate solvent such as dimethyl carbonate, ethylmethyl carbonate, diethyl carbonate, ethylene carbonate, propylene carbonate is further more preferred. One of the above-described other solvents may be used alone, or two or more other solvents may be used in combination.

Due to its high temperature stability, the silicate composition of the present invention may be advantageously combined with ionic liquid based electrolyte, either in the form of a liquid, gel or solid (e.g. polymer).

The ionic liquids preferably contain exclusively or substantially ions. Examples of cations include those which can be in alkylated form, such as imidazolium, pyridinium, pyrrolidinium, guanidinium, uronium, thiuronium, piperidinium, morpholinium, sulfonium, ammonium, and phosphonium cations. Examples of anions which can be used include halide, tetrafluoroborate, trifluoroacetate, triflate, hexafluorophosphate, phosphinate, and tosylate anions.

Exemplary ionic liquids include the following: N-methyl-N-propylpiperidinium bis(trifluoromethylsulfonyl)imide, N-methyl-N-butylpyrrolidinium bis(trifluoromethylsulfonyl)imide, N-butyl-N-trimethylammonium bis(trifluoromethylsulfonyl)imide, triethylsulfonium bis(trifluoromethylsulfonyl)imide, and N,N-diethyl-N-methyl-N-(2-methoxyethyl)ammonium bis(trifluoromethylsulfonyl)imide.

Lithium Salt

Suitable electrolytic salts include lithium salts such as, but are not limited to lithium hexafluorophosphate ($LiPF_6$), lithium perchlorate ($LiClO_4$), lithium hexafluoroarsenate ($LiAsF_6$), lithium trifluoromethylsulfonate ($LiCF_3SO_3$), lithium tetrafluoroborate ($LiBF_4$), lithium bromide (LiBr), and lithium hexafluoroantimonate ($LiSbF_6$), lithium bis(trifluoromethanesulfonyl)imide ($LiC_2F_6S_2O_6N$) and mixtures thereof. The salts can be used in combination with other salts including, without limitation, hydrolyzable salts such as $LiPF_6$ in any suitable amounts. Typically, the amount of such additional salts ranges from about 0.01 M to about 1.5 M.

Electrodes

Energy storage devices incorporating the silicate composition can employ any suitable cathode and anode. In forming a lithium secondary battery typically the anodes are non-metallic and can be based upon non-graphitizing carbon, natural or artificial graphite carbon, or tin, silicon, or germanium compounds or lithium titanium oxide. In other embodiments, the anode is a lithium metal or lithium metal alloy anode.

In some embodiments, the silicate composition forms part of a polymer composite membrane covering the electrode of the same composition as a polymer based electrolyte. In another embodiment, the silicate forms a glassy film (i.e. between 1 and 60 μm and preferably less than 50 μm and more preferably less than 30 μm) on the outer surface of the electrode. The film may serve as a stable solid electrolyte interphase (SEI) to inhibit dendritic growth of lithium whilst enabling lithium ions to be transported through the film.

The positive electrodes for use in lithium secondary batteries typically are based upon a lithium composite oxide with a transition metal such as cobalt, nickel, manganese, among others and mixtures thereof, or a lithium composite oxide, part of whose lithium sites or transition metal sites are replaced with cobalt, nickel, manganese, aluminium, boron, magnesium, iron, copper, among others and mixtures thereof or iron complex compounds such as ferrocyan blue, berlin green, among others and mixtures thereof. Specific examples of lithium composites for use as positive electrodes include $LiNi_{0.8}Co_{0.15}Al_{0.05}O_2$, $LiNi_{0.5}Co_{0.2}Mn_{0.3}O_2$, $LiNi_{1-x}Co_xO_2$ (where x is a number between 0 and 1) and lithium manganese spinel, $LiMn_2O_4$.

EXAMPLES

Fibres were formed using the sol-gel or melt spinning or blown method. The sol-gel samples are crystalline, whilst unless otherwise specified the melt samples are amorphous.

Melt Spinning Method

Fibres according to the invention have been produced by spinning [made from the melt by forming a molten stream and converting the stream into fibre by permitting the stream to contact one or more spinning wheels], at the applicant's research facilities in Bromborough, England by spinning or alternatively by blowing fibres made from the melt by forming a molten stream and converting the stream into fibre by using an air blast directed at the stream.

Samples

The fibrous samples were pelletised at pressures of 500-700 MPa after having been ground in a pestle and mortar. The green pellets (approximately 15 mm diameter×2 mm depth) were subsequently fired at temperatures ranging from 600-900° C. depending on the specific composition of the fibre. DSC was used to determine the sintering temperature, which was specified as being above the softening point and 25° C. below the crystallisation temperature to ensure the samples were amorphous. The relative density of the resultant pellets was between 67 to 80% of the absolute density of the material. A gold coating was applied with a thickness of about 100 nm to enable a uniform, highly conductive surface that is necessary for the EIS measurements.

Examples 1 to 13 (Table 1) were formed by the melt method as previously described. Comparative example C-1 to C-8 (Table 2) were formed by the sol-gel method as described in co-pending application GB1801684 (page 27, line 21 to page 30, line 18), which is incorporated herein by reference.

Example 11 which has a low ratio of network formers to network modifiers produced a poor quality fibre (from visual inspection the arithmetic fibre diameter was greater than 20 µm and the shot level greater than 60 wt %). As such the compositions were not considered melt formable compositions.

Sample 1 Results:

TABLE 3a

| Temperature ° C. | % shrinkage |
|---|---|
| 25 | 0 |
| 1000 | 0.05 |
| 1100 | 0.3 |
| 1200 | 0.8 |
| 1250 | 2.0 |
| 1300 | 7.9 |

Sample 4a Results:

TABLE 3b

| Temperature ° C. | % shrinkage |
|---|---|
| 700 | 0.8 |
| 725 | 0.8 |
| 750 | 6.6 |
| 775 | 15.9 |
| 800 | 32 |
| 900 | 43.1 |
| 1000 | 43.1 |

TABLE 1

| Sample | Target Composition | Actual Composition (wt %) | | | | | | | | Conductivity, $\sigma_g$ (Scm$^{-1}$) |
|---|---|---|---|---|---|---|---|---|---|---|
| | | $Li_2O$ | $ZrO_2$ | $SiO_2$ | CaO | $TiO_2$ | $Al_2O_3$ | $La_2O_3$ | $CeO_2$ | |
| 1 | $LiAlSiO_4$ | 12.14 | 0 | 54.70 | 0 | 0 | 33.15 | 0 | 0 | $3.22 \times 10^{-5}$ |
| 2 | $Li_2CaSiO_4$ | 17.71 | 0 | 43.46 | 38.83 | 0 | 0 | 0 | 0 | $4.04 \times 10^{-5}$ |
| 3 | $LiAlSi_2O_6$ | 6.86 | 0 | 69.84 | 0 | 0 | 22.82 | 0 | 0 | — |
| 4a | $Li_2ZrSi_6O_{15}$ | 5.64 | 22.53 | 71.83 | 0 | 0 | 0 | 0 | 0 | $1.32 \times 10^{-4}$ |
| 4b | $Li_2ZrSi_6O_{15}$ | 6.75 | 23.77 | 69.49 | 0 | 0 | 0 | 0 | 0 | $1.51 \times 10^{-4}$ |
| 5 | $Li_2Zr_{0.95}Ti_{0.05}Si_6O_{15}$ | 6.49 | 21.23 | 71.35 | 0 | 0.93 | 0 | 0 | 0 | $5.42 \times 10^{-5}$ |
| 6 | $Li_2Zr_{0.8}Ti_{0.2}Si_6O_{15}$ | 6.04 | 18.38 | 72.57 | 0 | 3.01 | 0 | 0 | 0 | $1.05 \times 10^{-4}$ |
| 7 | $Li_{2.05}Zr_{0.95}La_{0.05}Si_6O_{15}$ | 6.32 | 20.37 | 71.98 | 0 | 0 | 0 | 1.34 | 0 | $4.37 \times 10^{-5}$ |
| 8 | $Li_{2.2}Zr_{0.8}La_{0.2}Si_6O_{15}$ | 6.84 | 17.62 | 70.20 | 0 | 0 | 0 | 5.34 | 0 | $3.35 \times 10^{-5}$ |
| 9 | $Li_3ZrAlSi_5O_{15}$ | 9.53 | 22.00 | 59.00 | 0 | 0 | 9.47 | 0 | 0 | $5.46 \times 10^{-5}$ |
| 10 | $Li_2Zr_2Si_5O_{15}$ | 5.58 | 40.70 | 53.71 | 0 | 0 | 0 | 0 | 0 | $6.78 \times 10^{-5}$ |
| 11 | $Li_6ZrSi_5O_{15}$ | 18.96 | 22.98 | 58.06 | 0 | 0 | 0 | 0 | 0 | $1.26 \times 10^{-5}$ |
| 12 | $Li_2CeSi_6O_{15}$ | 6.83 | 0 | 72.39 | 0 | 0 | 0 | 0 | 20.78 | $2.90 \times 10^{-5}$ |
| 13 | $Li_{3.3}La_{0.33}Ti_{1.7}Si_3O_{11.5}$ | 11.15 | 0 | 44.99 | 0 | 31.66 | 0 | 11.15 | 0 | $3.50 \times 10^{-5}$ |

TABLE 2

| Sample | Target Composition | Actual Composition (wt %) | | | | | | | | Conductivity, $\sigma_g$ (Scm$^{-1}$) |
|---|---|---|---|---|---|---|---|---|---|---|
| | | $Li_2O$ | $ZrO_2$ | $SiO_2$ | $P_2O_5$ | $TiO_2$ | $Al_2O_3$ | $La_2O_3$ | SrO | |
| C-1 | $Li_{0.33}La_{0.557}TiO_3$ | 2.59 | 0 | 0 | 0 | 46.11 | 0 | 51.30 | 0 | $7.64 \times 10^{-5}$ |
| C-2 | $Li_7La_3Zr_2O_{12}$ | 12.70 | 25.75 | 0 | 0 | 0 | 0 | 61.54 | 0 | $8.91 \times 10^{-6}$ |
| C-3 | $Li_{5.5}Al_{0.5}La_3Zr_2O_{12}$ | 7.62 | 23.55 | 0 | 0 | 0 | 2.60 | 66.21 | 0 | $2.36 \times 10^{-5}$ |
| C-4 | $Li_{6.4}Al_{0.2}La_3Zr_2O_{12}$ | 10.97 | 24.32 | 0 | 0 | 0 | 1.17 | 63.54 | 0 | $4.41 \times 10^{-5}$ |
| C-5 | $Li_{3.3}La_{0.3}Zr_{1.7}Si_2PO_{12}$ | 10.18 | 36.15 | 28.18 | 15.39 | 0 | 0 | 10.09 | 0 | $4.23 \times 10^{-5}$ |
| C-6 | $Li_{0.4}Sr_{0.8}TiO_3$ | 6.03 | 0 | 0 | 0 | 81.42 | 0 | 0 | 12.55 | $5.87 \times 10^{-5}$ |
| C-7 | $Li_4SrAl_2SiO_8$ | 14.54 | 0 | 11.84 | 0 | 0 | 45.89 | 0 | 27.73 | $2.55 \times 10^{-5}$ |
| C-8 | $Li_3Al_3SiO_8$ | 17.13 | 0 | 58.17 | 0 | 24.70 | 0 | 0 | 0 | $6.93 \times 10^{-6}$ |

Fibre Shrinkage

Tests were performed by making a vacuum formed board in a 75 mm square template (thickness is dependent on amount of sample). The board is measured on all 4 sides using calibrated Vernier calipers at least twice so that an average is used. The board is then heated at a steady rate of 300° C. hr$^{-1}$ and held at the desired temperature for 24 hours before cooling. The 4 sides are measured again and the measurements compared to the initial in accordance with ISO 10635.

Fibre Diameter

Figure 1:
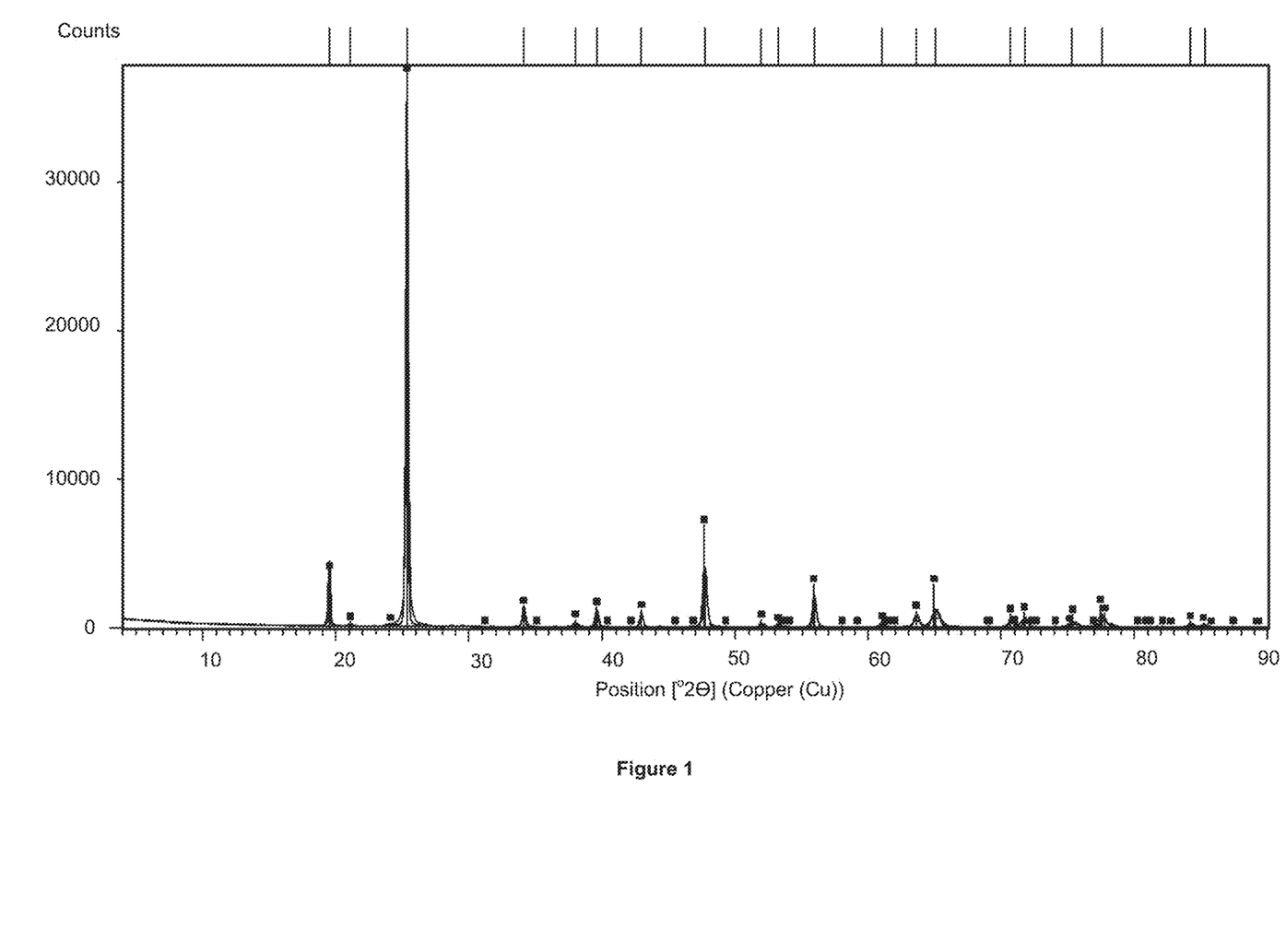
FIG. 1 is a XRD diagram for Sample 1, after being fired at 1000° C.
Figure 2:
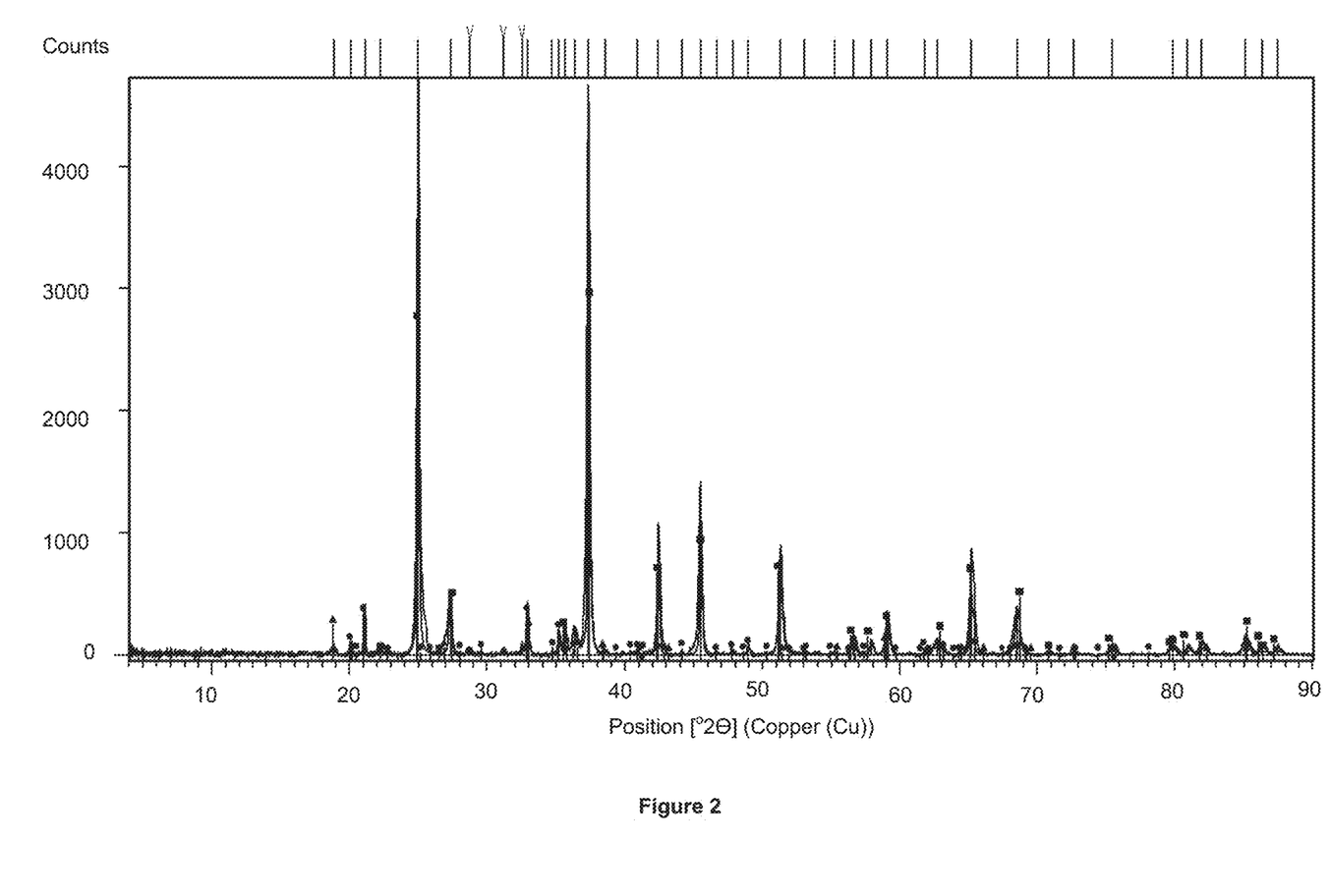
FIG. 2 is a XRD diagram for Sample 2, after being fired at 1000° C.
Figure 3:
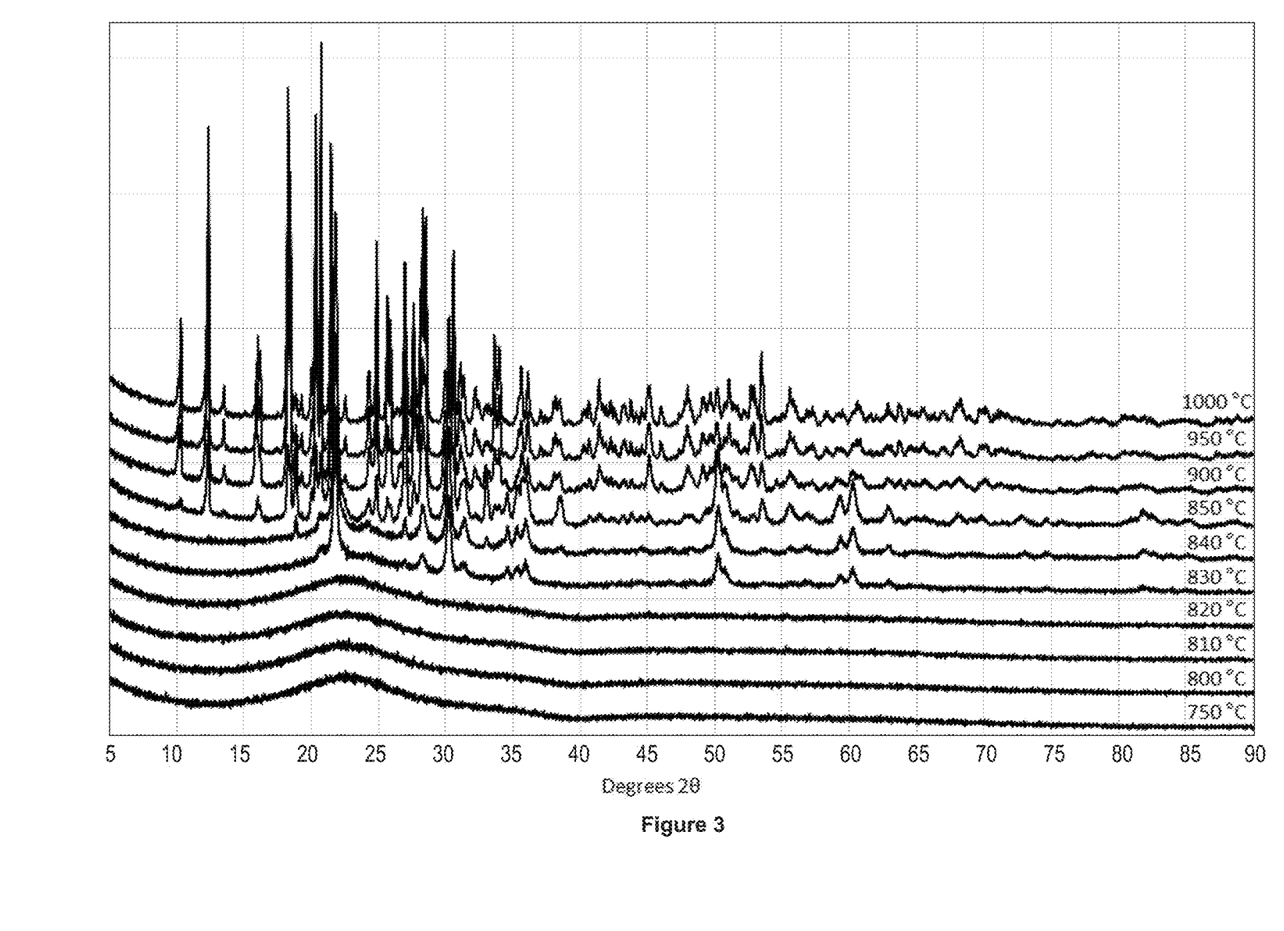
FIG. 3 is a XRD diagram for Sample 4a after heat treatment at various temperatures.
Figure 4:
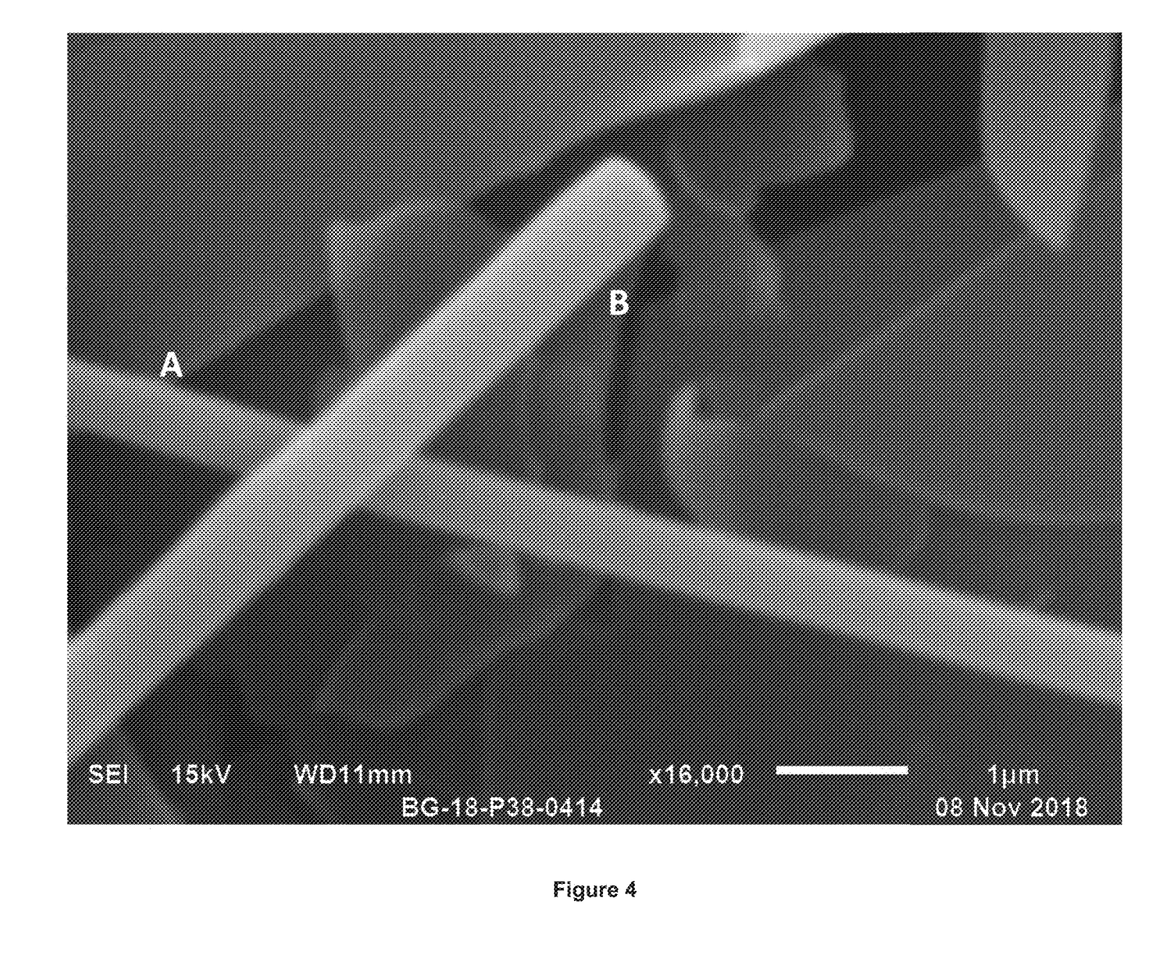

Melt-formed fibre was chopped using an oscillating granulator through a ⅛" steel mesh. Fibre diameters were determined from SEM images of a sample taken at ×1500 magnification using auto focus. The software macro sweeps across the sample taking 350 images. The images are then analysed using the Scandium™ software package where any fibre with an aspect ratio greater than 3:1 that lies on the central line of the image is measured. All samples below this aspect ratio are not considered fibres.
Sample 2 Results:
Geometric mean diameter: 2.27 μm
Arithmetic mean diameter: 2.47 μm
Standard Deviation: 1.27 μm
Air Classified Material
The collected material was then passed through an air classification process to remove shot from the as-made material. By altering the speed of the rotor it is possible to acquire finer fibres, and reduce the shot content considerably
Sample 4a Results:
Air classified with a blade speed of 1700 rpm and an air speed of 120 m$^3$ hr$^{-1}$.
Geometric mean diameter: 3.83 μm
Arithmetic mean diameter: 5.11 μm
Standard Deviation: 4.18 μm
Reduction of 58 wt % shot to <5 wt %,
Formation of Nanowires.
Sample 4a was subjected to air classification with a blade speed of 10,000 rpm and an air speed of 90 m$^3$ hr$^{-1}$.
Geometric mean diameter: 1.08 μm
Arithmetic mean diameter: 1.28 μm
Standard Deviation: 1.05 μm
FIG. 4 illustrates fibre A (655 nm diameter) and fibre B (490 nm diameter)
Crystalline/Amorphous Form
XRD measurements were taken of:
Sample 1, after being fired at 1000° C. (FIG. 1);
Sample 2, after being fired at 1000° C. (FIG. 2);
Sample 4a, after being fired between 750° C. and 1000° C. (FIG. 3).
The results indicated that:
Sample 1 contained eucryptite (LiAlSiO$_4$) (peak intensity score: 86).
Sample 2 contained Li$_2$CaSiO$_4$, Li$_2$Ca$_2$Si$_2$O$_7$ and Li$_2$SiO$_3$ (peak intensity scores 52, 33 and 25)
Sample 4a remained amorphous up until 820° C. after which the crystalline emerges and predominates at a firing temperature of 1000° C.
Ionic Conductivity
Conductivity measurements were carried out using A.C. impedance spectroscopy [Solartron Modulab manufactured by AMETEK Advanced Measurement Technology: equipment setup of XM CHAS 08; XM PSTAT 1MS/s; XM PSTAT AUX and XM BOOSTER 2A] over a range of 1 MHz to 10 mHz at room temperature. The grain conductivity was calculated from the high frequency resistance.
The results (Table 1) highlight that compositions under the present invention produce ionic conductivity with good utility for use in energy storage devices. In particular, silicate compositions further comprising zirconium exhibit excellent ionic conductivity compared to the comparative examples (Table 2).

TABLE 4

| Sample | (x + y)/(v + w) | v/(v + w + x + y) |
|---|---|---|
| 4 | 2.0 | 0.22 |
| 5 | 2.0 | 0.22 |
| 6 | 2.0 | 0.22 |

TABLE 4-continued

| Sample | (x + y)/(v + w) | v/(v + w + x + y) |
|---|---|---|
| 7 | 1.97 | 0.22 |
| 8 | 1.88 | 0.24 |
| 9 | 1.5 | 0.3 |
| 10 | 1.25 | 0.22 |
| 11 | 0.71 | 0.5 |
| 12 | 2.0 | 0.22 |
| 13 | 0.56 | 0.39 |

As indicated in Table 4, Sample 11 had relatively high lithium content (v/(v+w+x+y)) and a relatively low ratio of network formers (x+y) to network modifiers (v+w). In addition to this sample being more difficult to fiberize, the higher lithium content correlated with a lower ionic conductivity.
Formation of Composite Electrolyte Membrane (Electrolyte Matrix)
Polyacrylonitrile 2.17 wt % (PAN) and 1.29 wt % LiClO$_4$ salt were combined in dimethylformamide (DMF), the solution was stirred at 80° C. for 5 hrs. A sufficient amount of sample 4a (arithmetic fibre diameter: 5.11 μm) fibre was added to form a slurry, that would result in a 5.0 wt % fibre content (59.6 wt % PAN and 35.4 wt % LiClO$_4$) of the final dried composite material, and was stirred vigorously for 5 hrs in a sealed vial. The mixture was cast onto a glass substrate and dried in a vacuum oven overnight at 50° C. to form the composite membrane material of about 50-60 μm thickness. It is expected that a lower film thickness may be achieved with a further dilution with DMF in the starting solution. A membrane was cut into a 19 mm diameter disc and placed between stainless steel plates and ionic conductivity (total) measurements ($\sigma_{total}$) were carried out using A.C. impedance spectroscopy over a frequency range of 1 MHz-10 mHz and a temperature range from 22° C. to 80° C.

TABLE 5

| Temperature | Conductivity $\sigma_r$ (Scm$^{-1}$) |
|---|---|
| 22° C. (room temperature) | 1.95 × 10$^{-4}$ |
| 40° C. | 3.85 × 10$^{-4}$ |
| 60° C. | 6.35 × 10$^{-4}$ |
| 80° C. | 1.06 × 10$^{-3}$ |

The results (Table 5) show an improvement in conductivity compared to electrolyte matrixes comprising 5 wt % nanowires of Li$_7$La$_3$Zr$_2$O$_{12}$ (LLZO) reported in Yang et al., ACS Appl. Mater. Interfaces, 2017, 9, 21773 and 3 wt % nanowires of Li$_{0.33}$La$_{0.557}$TiO$_3$ (LLTO) reported in Liu et al., Nature Energy, 2017, 2, 17035: using comparable methodology and based materials (PAN and LiClO$_4$) and a significant increase in comparison to the membrane without the addition of inorganic fibres.
This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

The invention claimed is:
1. A lithium energy storage device comprising:
a glass or a glass ceramic silicate composition comprising:

1 to 30 wt % $Li_2O$;
10 to 60 wt % $ZrO_2$; and
20 to 80 wt % $SiO_2$,
wherein the sum of $Li_2O+ZrO_2+SiO_2$ is greater than 50 wt %, the silicate composition further including oxides selected from the group consisting of alkaline earth metal oxides, boron oxide, tantalum oxide, gallium oxide, potassium oxide, germanium oxide, lanthanum oxide, vanadium oxide, manganese oxide, iron oxide, cerium oxide, niobium oxide, titanium oxide and combinations thereof, and there is a sum of the oxides+$Li_2O+ZrO_2+SiO_2$ that is at least 95 wt %, wherein the silicate composition forms part of a lithium ion conductive electrolyte, a separator and/or an electrode.

2. The device according to claim 1, wherein in the glass or glass ceramic silicate composition there is a combined amount of $Al_2O_3$ and $TiO_2$ between 0.5 wt % and 30 wt % and the amount of Li2O is between 0.5 wt % and 15 wt %.

3. The device according to claim 1, wherein in the glass or glass ceramic silicate composition is in the form of a nanowire or a fibre.

4. The device according to claim 1, wherein in the glass or glass ceramic silicate composition there is less than 1.0 wt % phosphorus oxide.

5. The device according to claim 1, wherein in the glass or glass ceramic silicate composition there is:
   4 to 12 wt % $Li_2O$;
   15 to 55 wt % $ZrO_2$;
   50 to 75 wt % $SiO_2$; and
   0 to 30 wt % other components selected from the group consisting of alkaline earth metal oxide, boron oxide, tantalum oxide, gallium oxide, potassium oxide, germanium oxide, lanthanum oxide, vanadium oxide, manganese oxide, iron oxide, cerium oxide, niobium oxide, titanium oxide and combinations thereof.

6. The device according to claim 1, wherein there is in the glass or glass ceramic silicate composition 3 to 15 wt % $Li_2O$.

7. The device according to claim 1, wherein there is in the glass or glass ceramic silicate composition less than 18 wt % $Li_2O$.

8. The device according to claim 1, wherein there is in the glass or glass ceramic silicate composition:
   0 to 80 wt % silicate composition fibres;
   0 to 80 wt % silicate composition particles; and
   20 to 98 wt % lithium ion conducting organic electrolyte.

9. The device according to claim 1, wherein the lithium ion conducting organic electrolyte comprises an electrolytic salt dissolved or dispersed in an electrolytic medium.

10. The device according to claim 1, wherein the electrolytic medium comprises a polymer.

11. The device of claim 1, wherein in the glass or a glass ceramic silicate composition there is a sum of $Li_2O+ZrO_2+SiO_2$ greater than 80 wt %.

12. A lithium energy storage device comprising:
   a glass or a glass ceramic silicate composition comprising:
   1 to 30 wt % $Li_2O$;
   10 to 60 wt % $ZrO_2$; and
   20 to 80 wt % $SiO_2$,
   wherein the sum of $Li_2O+ZrO_2+SiO_2$ is greater than 50 wt %, the silicate composition further including oxides selected from the group consisting of alkaline earth metal oxides, boron oxide, tantalum oxide, gallium oxide, germanium oxide, lanthanum oxide, vanadium oxide, manganese oxide, iron oxide, cerium oxide, niobium oxide and combinations thereof, and there is a sum of the oxides +$Li_2O+ZrO_2+SiO_2$ that is at least 98 wt %, wherein the silicate composition forms part of a lithium ion conductive electrolyte, a separator and/or an electrode.

13. The device of claim 12, wherein in the glass or a glass ceramic silicate composition there is a sum of $Li_2O+ZrO_2+SiO_2$ greater than 80 wt %.

14. The device according to claim 12, wherein in the glass or a glass ceramic silicate composition there is 3 to 15 wt % $Li_2O$.

* * * * *